United States Patent [19]

Dotson

[11] Patent Number: 5,532,318
[45] Date of Patent: Jul. 2, 1996

[54] IMPACT MODIFIER FOR HIGH NITRILE RESINS AND IMPACT MODIFIED NITRILE RESIN COMPOSITIONS

[75] Inventor: Seldon L. Dotson, Parkersburg, W. Va.

[73] Assignee: General Electric Company, Pittsfield, Mass.

[21] Appl. No.: 312,376

[22] Filed: Sep. 26, 1994

[51] Int. Cl.$^6$ .................................................. C08L 51/04
[52] U.S. Cl. ............................................. 525/83; 525/86
[58] Field of Search ............................. 525/83, 316, 86

[56] References Cited

U.S. PATENT DOCUMENTS

| | | |
|---|---|---|
| 3,923,922 | 12/1975 | Grant. |
| 3,925,305 | 12/1975 | Wardlow ..................... 260/45.9 NC |
| 4,151,151 | 4/1979 | Isley ............................. 260/30.4 N |
| 4,410,659 | 10/1983 | Lee ..................................... 525/53 |
| 4,415,708 | 11/1983 | Matsumura ...................... 525/316 |
| 4,478,982 | 10/1984 | Matsumura ...................... 525/316 |
| 4,703,083 | 10/1987 | Giori et al.. |
| 4,703,084 | 10/1987 | Giori et al.. |
| 5,004,783 | 4/1991 | Percec ................................ 525/77 |
| 5,180,779 | 1/1993 | Kamoshita ........................ 525/87 |
| 5,206,062 | 4/1993 | Ameniya ...................... 428/36.92 |

FOREIGN PATENT DOCUMENTS 1146295  5/1983  Canada.

*Primary Examiner*—Vasu S. Jagannathan

[57] ABSTRACT

The high nitrile graft copolymer is provided and a high nitrile resin composition impact modified thereby is also provided. Brittle high nitrile resins can be effectively impact modified by the addition of a high nitrile graft copolymer thereto. The high nitrile graft copolymer contains a rubber substrate and a polymeric graft portion superstrate. The substrate contains high levels of diene and amounts of vinyl cyanide and alkylmethacrylate. The polymeric graft portion (superstate) contains high level of vinyl cyanide and a vinyl aromatic hydrocarbon. The high nitrile resin composition is useful as a resin for making chemical resistant high impact molded articles.

2 Claims, No Drawings

IMPACT MODIFIER FOR HIGH NITRILE RESINS AND IMPACT MODIFIED NITRILE RESIN COMPOSITIONS

BACKGROUND OF THE INVENTION

1. Field of the Invention

The present invention relates to graft copolymers and impact modified resin compositions, and more particularly relates to graft copolymers useful for impact modifying high nitrile resins and impact modified high nitrile resin compositions.

2. Description of the Related Art

High nitrile resins are known, and rubber free high nitrile resins are generally brittle. While various type of conventional impact modifiers can provide some improvement in impact strength when added to brittle high nitrile resin, there is a desire to provide an impact modifier which provides efficient and substantial enhancements in impact strength.

SUMMARY OF THE INVENTION

The present invention involves graft copolymers and high nitrile resins impact modified therewith, wherein the graft copolymers have a rubber substrate of diene/vinyl cyanide/alkyl methacrylate and a graft portion having a high vinyl cyanide content. The graft polymer is effective at enhancing the impact strength of brittle high nitrile resins and when added thereto provides an impact modified high nitrile resin composition.

DETAILED DESCRIPTION OF THE INVENTION

The impact modified resin composition contains a high nitrile graft copolymer and a brittle high nitrile resin. The graft copolymer is preferably present at a level of from 7.5–42.5 percent by weight based on the total weight of the composition, more preferably from 10 to 40 percent by weight thereof, even more preferably from 20 to 35 percent by weight thereof, and most preferably at a level of 30 percent by weight thereof. The high nitrile resin is preferably present in the composition at a level of from 57.5 weight percent to 92.5 weight percent based on the total weight of the composition, more preferably from 60 to 90 percent by weight thereof, even more preferably from 65 to 80 percent by weight thereof, and most preferably at 70 percent by weight thereof. Preferably the composition is free of other rubbery impact modifiers, and is preferably free of reinforcing fillers or fibers.

The high nitrile resin contains 55 to 95 percent by weight of a vinyl cyanide monomer based on the total weight of the high nitrile resin, more preferably contained from 60 to 90 percent by weight thereof, and most preferably contains from 75 to 90 percent by weight thereof. The vinyl cyanide monomer is preferably selected from the group consisting of methacrylonitrile and acrylonitrile. The high nitrile resin further contains a second monomer selected from the group consisting of alkylmethacrylates, monovinyl aromatics and mixtures thereof, and said second monomer is preferably present at a level of from 5 to 45 percent by weight based on the total weight of the high nitrile resin, more preferably from 10 to 30 percent by weight thereof, and most preferably from 10 to 25 percent by weight thereof. It is understood that monomer levels are actually in reacted form in the polymeric product.

The monovinyl aromatic monomers utilized are generally described by the formula:

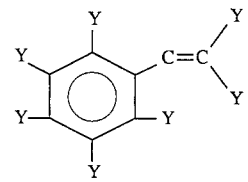

wherein Y may be selected from the group consisting of hydrogen, alkyl groups containing from one to five carbon atoms, chloro and bromo. Examples of the monovinyl aromatic monomers and substituted monovinyl aromatic monomers that may be used are styrene and other vinyl-substituted aromatic monomers including alkyl-, cycloalkyl-, aryl-, alkaryl-, aralkyl-, alkoxy-, aryloxy- and other substituted vinyl aromatic compounds. Examples of such compounds are 4-methyl-styrene, 3,5-diethyl-styrene and 4-n-propylstyrene, α-methylstyrene, α-methylvinyltoluene, α-chlorostyrene, vinyltoluene, α-bromostyrene, chlorophenylethylenes, dibromophenylethylenes, tetrachlorophenylethylenes, 1-vinylnaphthalene, 2-vinylnaphthalene, mixtures thereof and the like. The preferred monovinyl aromatic monomer is styrene and/or α-methylstyrene. The alkylmethacrylate, preferably $C_1$–$C_{16}$ methacrylate, is most preferably methylmethacrylate.

The vinyl aromatic monomer, is preferably selected from the group consisting of styrene and its derivatives such as α-methylstyrene, α-chlorostyrene, p-chlorostyrene, 2,4-dichlorostyrene, p-methylstyrene, 3,4-dimethylstyrene, o- and p-divinyl benzene, p-methyl-α-methylstyrene and p-chloro-α-methylstyrene.

The alkylmethacrylates may be selected from the group consisting of methylmethacrylate, ethylmethacrylate, n-propyl and isopropyl methacrylate, n-butyl and isobutyl methacrylate, cyclohexylmethacrylate and isobornyl methacrylate.

The high nitrile graft copolymer preferably contains a nitrile-butadiene rubber substrate and a polymeric graft portion grafted thereto. The high nitrile graft copolymer preferably contains the substrate at a level of from 25 to 75 percent by weight based on the total weight of the graft copolymer, more preferably from 40 to 60 percent by weight thereof, and most preferably at a level of about 50 percent by weight thereof. The high nitrile graft copolymer preferably contains the rigid polymeric graft portion at a level of from 25 to 75 percent by weight based on the total weight of the graft copolymer, more preferably at a level of from 40 to 60 percent by weight thereof, and most preferably at a level of about 50 percent by weight thereof.

The rubber substrate was prepared by polymerizing at least one conjugated diene, such as butadiene, with a vinyl cyanide monomer, and an alkylmethacrylate monomer. The conjugated diene monomer may be represented by the general formula

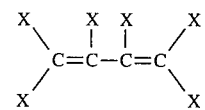

wherein X may be selected from the group consisting of hydrogen, alkyl groups containing from one to five carbon atoms, chloro and bromo. Examples of dienes that may be used are butadiene; isoprene; 1,2-heptadiene; methyl-1,3-pentadiene, 2,3-dimethyl-1,3-butadiene; 2-ethyl-1,3-pentadiene, 1,3-and 2,4-hexadienes, chloro and bromo-substituted butadienes such as dichlorobutadiene, bromobutadiene, chloroprene, dibromobutadiene, mixtures thereof and the like. The preferred conjugated diene is 1,3 butadiene. The vinyl cyanide monomer may be selected from the classes outlined above for the high nitrile resins, and is most preferably acrylonitrile. The alkylmethacrylate while may be selected from the classes outlined above for the high nitrile resins, is most preferably methylmethacrylate. The diene monomer is preferably present at a level of from 60 to 85 percent by weight based on the total weight of the substrate, more preferably present at a level of from 70 to 80 percent by weight thereof, and most preferably present at a level of about 75 percent by weight thereof; the vinyl cyanide monomer is preferably present at a level of from 10 to 30 percent by weight based on the total weight of the substrate, more preferably present at a level of from 15 to 25 percent by weight thereof, and most preferably present at a level of 20 percent by weight thereof; and the alkylmethacrylate is preferably present at a level from 1 to 20 percent by weight based on the total weight of the substrate, and more preferably present at a level of from 2 to 10 percent by weight thereof, and most preferably present at a level of about 5 percent by weight thereof. The term "about" may be utilized to indicate the above amounts plus or minus i percent, in other words, the term "about 5 percent " would mean a range of from "4 percent to 6 percent".

The polymeric graft portion of the graft copolymer, is derived from a vinyl cyanide monomer and a vinyl aromatic monomer, wherein the classes of vinyl cyanide monomer and vinyl aromatic monomer are as set out above. The vinyl cyanide monomer is preferably acrylonitrile, and the vinyl aromatic monomer is preferably styrene. The polymeric graft portion preferably contains from 53 to 70 percent by weight vinyl cyanide monomer based on the total weight of the polymeric graft portion, more preferably from 55 to 65 percent by weight thereof, and most preferably about 60 percent by weight thereof; and preferably contains the vinyl aromatic monomer at a level of from 30 to 47 percent by weight based on the total weight of the polymeric graft portion, more preferably from 35 to 45 percent by weight thereof, most preferably present at a level of about 40 percent by weight thereof.

The present high nitrile graft copolymers are impact modifiers which impart very high impact resistance, as measured by notched Izod impact strength, to high nitrile resins, and have very high impact efficiencies in high nitrile resins compared to conventional impact modifiers.

EXAMPLES

A high nitrile graft copolymer was prepared as follows: The nitrile-butadiene rubber substrate was made by bottled polymerization utilizing the following procedure, a first solution containing 200 parts by weight demineralized water, 1.75 parts by weight sodium lauryl sulphate, 2.5 parts by weight of soap (24750 k-oleate), 0.05 parts by weight Versonol 120 trisodium salt of ethylene diamine tetraacetic acid ($Na_3$ EDTA); the second solution was made containing 10.0 parts by weight acrylonitrile and 0.4 parts by weight t-DDM (tertiary dodecyl mercaptan).

The first solution and the second solution were combined in their totality and were charged to a 28 ounce citrate bottle with additional ingredients so that the contents of the bottle were as follows: 205.80 parts by weight of first solution, 10.45 parts by weight of second solution, 10.00 parts by weight acrylonitrile, 5.00 parts by weight methylmethacrylate, 75 parts by weight butadiene, and 0.40 parts by weight Vazo 64 (2,2'-azo bisisobutyronitrile). The contents in the citrate bottle were polymerized for 20 hours at 50° C., and short-stopped with 7.2 milliliters of 1 percent hydroquinone solution, and 2 parts per 100 weight of 6/1 21110 AOE (Antioxidant Emulsion composed of 1 part primary AO 2,2'-methylene bis(4-ethyl-6-t-butylphenol) and 6 parts of secondary AO such as tris nonyl phenol phosphite in an emulsion form) was added, and pH was adjusted to 11.0. The resultant substrate contained 20 percent by weight acrylonitrile, 5 percent by weight methylmethacrylate, and 75 percent by weight butadiene.

The stepwise graft reaction was run as follows

|  |  | Parts |
| --- | --- | --- |
| DM $H_2O$ |  | 141.500 |
| Dresinate 731 |  | 0.250 |
| NBR Substrate | a | 50.000 |
| t-DDM |  | 0.200 |
| Styrene |  | 7.500 |
| DM $H_2O$ | b | 5.000 |
| Cerelose |  | 0.300 |
| DM $H_2O$ |  | 5.000 |
| TSPP |  | 0.050 |
| $FeSO_4$ | c | 0.002 |
| CHP | d | 0.350 |
| Styrene |  | 12.500 |
| Acrylonitrile | e | 30.000 |

The resultant graft polymer (HNGCP designated below) contained 50 percent by weight substrate and 50 percent by weight polymeric graft portion. The polymeric graft portion contained 60 percent by weight acrylonitrile and 40 percent by weight styrene,

|  | A | 1 | B | 2 | C | 3 | D | 4 |
| --- | --- | --- | --- | --- | --- | --- | --- | --- |
| HNR1 | 100 | 70 |  |  |  |  |  |  |
| HNR2 |  |  | 100 | 70 |  |  |  |  |
| HNR3 |  |  |  |  | 100 | 70 |  |  |
| HNR4 |  |  |  |  |  |  | 100 | 70 |
| HNGCP |  | 30 |  | 30 |  | 30 |  | 30 |
| Notched Izod (ft-lbs/in) | 0.2 | 7.5 | 0.5 | 10.6 | 0.2 | 8.5 | 0.7 | 20.2 |

Notched Izod tests were conducted at room temperature or ⅛" thick samples.

HNR1 is resin which is a brittle high nitrile acrylonitrile-styrene copolymer resin.

HNR2 is a brittle high nitrile acrylonitrilestyrene copolymer resin.

HNR3 is a high nitrile acrylonitrile-styrene copolymer resin.

HNR4 is a brittle high nitrile resin.

HNGCP is the high nitrile graft copolymer made by the above process and having the above contents. Note the substantial enhancement and impact strength achieved by utilization of the present graft copolymer and various brittle high nitrile resins.

|  | E | F | G | H | I | J |
| --- | --- | --- | --- | --- | --- | --- |
| HNR4 | 100 | 70 |  |  |  |  |
| IMP1 |  | 30 |  |  |  |  |
| IMP2 |  |  | 30 |  |  |  |
| IMP3 |  |  |  | 30 |  |  |
| IMP4 |  |  |  |  |  | 30 |

-continued

|  | E | F | G | H | I | J |
|---|---|---|---|---|---|---|
| IMP5 |  |  |  |  |  | 30 |
| Notched Izod Impact (ft-lbs/in) | 1.1 | 1.4 | 1.8 | 1.6 | 2.3 | 1.1 |

Notched Izod tests were conducted at room temperature or 1/8" thick samples.

|  | K | L | M | N | O |
|---|---|---|---|---|---|
| IMP6 | 30 |  |  |  |  |
| IMP7 |  | 30 |  |  |  |
| IMP8 |  |  | 30 |  |  |
| IMP9 |  |  |  | 30 |  |
| Notched Izod Impact (ft-lbs/in) | 1.4 | 0.9 | 0.9 | 0.5 | 0.2 |

Notched Izod tests were conducted at room temperature or 1/8" thick samples.

|  | P | Q | R | 5 | 6 | 7 | 8 |
|---|---|---|---|---|---|---|---|
| HNR4 | 100 | 97.5 | 95 | 92.5 | 90 | 80 | 70 |
| HNGCP |  | 2.5 | 5 | 7.5 | 10 | 20 | 30 |
| GCP2 |  |  |  |  |  |  |  |
| NI Impact (ft-lb/in) | 0.7 | 1.1 | 1.3 | 3.7 | 6.5 | 15.9 | 20.2 |

IMP1 is a graft copolymer having the following composition 45 parts butadiene rubber/18.3 parts acrylonitrile/36.7 parts styrene wherein the butadiene particle size ranges are from 670–750 Å diameter.

IMP2 is a graft copolymer having the following composition 50 parts butadiene rubber/16.7 parts acrylonitrile/33.3 parts styrene.

IMP3 is a graft copolymer having the following composition 45 parts butadiene rubber/18.3 parts acrylonitrile/36.7 parts styrene wherein the butadiene particle size average is 700 Å diameter.

IMP4 is a graft copolymer having the following composition 57 parts butadiene-styrene rubber/20.6 parts styrene/9.9 parts acrylonitrile/12.5 parts methylacrylate.

IMP5 is a graft copolymer having the following composition 57 parts butadiene-styrene rubber/19.0 parts styrene/2.5 parts acrylonitrile/21.5 parts methylmethacrylate.

IMP6 is a graft copolymer having the following composition 65 parts butadiene-styrene rubber/14.5 parts styrene/2.0 parts acrylonitrile/19.5 parts methylmethacrylate.

IMP7 is a graft copolymer having the following composition 65 parts butadiene-styrene-DVB/15.5 parts styrene/2.0 parts acrylonitrile/17.5 parts methylmethacrylate wherein DVB=divinylbenze at 1.5 parts/74 parts butadiene/24.5 parts styrene-substrate.

IMP8 is a graft copolymer having the following composition 65 parts butadiene-styrene-DVB/15.5 parts styrene/2.0 parts acrylonitrile/17.5 parts methylmethacrylate wherein DBV @ 2.0 parts/75 parts butadiene/23 parts styrene substrate.

IMP9 is a graft copolymer having the following composition is a methylmethacrylate-acrylonitrilebutadiene styrene graft copolymer.

In view of the above examples, the superior results and unexpected enhancements demonstrated by the above examples clearly demonstrate the improvement achieved by the present graft copolymers and more particularly further show their ability to enhance impact strengths and high nitrile resins to yield high nitrile resin compositions exhibiting enhanced impact strengths. Preferably the compositions of the present invention exhibit impact strengths of greater than 6.0 ftlb per inch. Notched Izod was measured by ASTM D256A and units were in foot-pounds per inch. Examples 1–8 illustrate the present invention.

What is claimed is:

1. A high nitrile resin composition having a impact strength greater than 6.0 ft. lb. per inch and consisting essentially of:

(a) a high nitrile resin comprising 55 to 95 percent by weight of vinyl cyanide monomer based on the total weight of the high nitrile resin and 5 to 45 percent by weight of a monomer selected from the group consisting of alkylmethacrylates, vinyl aromatic monomers and mixtures thereof based on the total weight of the high nitrile resin, said high nitrile resin formulation being a substantially brittle formulation; and (b) a high nitrile graft copolymer for enhancing the impact resistance of said brittle formulation and comprising 25 to 75 percent by weight of a rubbery substrate based on the total weight of the graft copolymer, and 25 to 75 percent by weight of a polymeric graft portion based on the total weight of the graft copolymer, said rubbery substrate comprising 60 to 85 percent by weight of a diene monomer, 10 to 30 percent by weight of a vinyl cyanide monomer, and 4 to 6 percent by weight of an alkylmethacrylate monomer, based on the total weight of the substrate, said alkylmethacrylate forming said high nitrile graft portion in a sufficient amount for imparting enhanced notched Izod impact strength of greater than 6.0 ftlb per inch, said polymeric graft portion comprising 53 to 70 percent by weight of a vinyl cyanide monomer based on the total weight of the polymeric graft portion, and said polymeric graft portion containing 30 to 47 percent by weight of a vinyl aromatic monomer based on the total weight of the polymeric graft portion, said graft copolymer being present in said composition at a level of from 20 to 35 weight percent and said high nitrile resin being present in said composition at a level of from 65 to 80 weight percent based on the total weight of the composition.

2. The composition of claim 1 wherein said graft copolymer is present at a level of about 30 percent by weight based on the total weight of the composition, and said high nitrile resin is present at a level of about 70 percent by weight based on the total weight of the composition, said alkylmethacrylate being present in an amount of about 5 percent by forming said high nitrile graft portion in a sufficient amount for imparting enhanced notched Izod impact strength of at least 15.9 ftlb per inch.

* * * * *